(12) United States Patent
Strand et al.

(10) Patent No.: US 11,848,546 B2
(45) Date of Patent: Dec. 19, 2023

(54) HIGH VOLTAGE WIRE PROTECTION SYSTEM FOR ELECTRIC VEHICLES

(71) Applicant: MAGNA POWERTRAIN OF AMERICA, INC., Troy, MI (US)

(72) Inventors: Ryan Strand, Rochester Hills, MI (US); Wade Smith, Mussey, MI (US); Bradley Ketchel, Oxford, MI (US); Ryan Shaw, Southfield, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 67 days.

(21) Appl. No.: 17/590,004

(22) Filed: Feb. 1, 2022

(65) Prior Publication Data
US 2022/0247161 A1   Aug. 4, 2022

Related U.S. Application Data

(60) Provisional application No. 63/144,111, filed on Feb. 1, 2021.

(51) Int. Cl.
*H02G 3/04* (2006.01)
*H02M 7/00* (2006.01)

(52) U.S. Cl.
CPC ........... *H02G 3/045* (2013.01); *H02G 3/0475* (2013.01); *H02M 7/003* (2013.01)

(58) Field of Classification Search
None
See application file for complete search history.

(56) References Cited

U.S. PATENT DOCUMENTS

| | | | | |
|---|---|---|---|---|
| 239,147 | A | * | 3/1881 | Edison ................. H02M 7/003 307/42 |
| 3,647,936 | A | * | 3/1972 | Dryg .................... H02G 11/006 174/DIG. 9 |
| 5,460,051 | A | * | 10/1995 | Trieb .................. H02G 11/006 248/68.1 |

(Continued)

FOREIGN PATENT DOCUMENTS

| | | | | |
|---|---|---|---|---|
| BR | 112020025464 | A2 | * 3/2021 | ........... E21B 17/017 |
| CN | 1831369 | A | * 9/2006 | ............. F16G 13/16 |

(Continued)

OTHER PUBLICATIONS

WO2015030147_original_translation. Nakamura (Year: 2015).*
WO2012063399_original_translation. Mochizuki (Year: 2012).*

*Primary Examiner* — Timothy J. Dole
*Assistant Examiner* — Muhammed Azam
(74) *Attorney, Agent, or Firm* — Dickinson Wright PLLC

(57) ABSTRACT

A flexible wire support structure extends between an axle and an inverter for an electric vehicle. The inverter is fixed relative to the vehicle body and the axle is moveable relative to the inverter during vehicle use. A wire extends between the inverter and the axle through a channel defined by the wire support structure. The wire support structure is attached at opposite ends to a first and second support structure, each of which allow pivoting of the flexible wire support structure in response to movement of the axle relative to the inverter. The wire support structure has a limited bend radius in response to movement of the axle, and blocks the wire extending within the support structure from being bent to a tight radius, thereby protecting the wire.

20 Claims, 14 Drawing Sheets

(56) References Cited

U.S. PATENT DOCUMENTS

| | | | | |
|---|---|---|---|---|
| 5,566,969 | A | * | 10/1996 | Tattermusch ............ B60G 9/027 280/124.117 |
| 5,806,812 | A | * | 9/1998 | Jacobs ................ B60R 16/0215 248/73 |
| 7,244,894 | B1 | * | 7/2007 | Lipp .................. B60R 16/0222 174/152 G |
| 7,369,381 | B2 | * | 5/2008 | Tsukamoto ......... B60R 16/0215 174/72 A |
| 7,423,223 | B2 | * | 9/2008 | Taira ........................ B60S 1/48 174/152 G |
| 7,484,351 | B2 | | 2/2009 | Harada et al. |
| 7,758,058 | B2 | * | 7/2010 | Bordini ................ A01B 69/006 280/771 |
| 9,481,329 | B2 | * | 11/2016 | Yoshimura ........... H01B 17/583 |
| 9,553,414 | B2 | * | 1/2017 | Matayoshi ............. H01R 39/64 |
| 10,680,421 | B2 | | 6/2020 | Ruebel |
| 2003/0183413 | A1 | * | 10/2003 | Kato .................. B60R 16/0215 174/135 |
| 2004/0083655 | A1 | * | 5/2004 | Suzuki ................... H02G 11/00 49/352 |
| 2004/0084932 | A1 | * | 5/2004 | Suzuki ............... B60R 16/0215 296/155 |
| 2007/0148992 | A1 | * | 6/2007 | Sato ................... B60R 16/0207 439/34 |
| 2007/0148994 | A1 | * | 6/2007 | Sato ................... B60R 16/0215 439/34 |
| 2010/0026043 | A1 | * | 2/2010 | Shima ................. H02G 3/0468 296/146.9 |
| 2010/0283287 | A1 | * | 11/2010 | Toyozumi .......... B60R 16/0215 296/146.9 |
| 2010/0327709 | A1 | * | 12/2010 | Minato .................. H02K 11/33 361/736 |
| 2011/0068622 | A1 | * | 3/2011 | Ikeno ....................... B60K 1/00 307/10.1 |
| 2014/0238740 | A1 | * | 8/2014 | Inoue ................. B60R 16/0215 174/72 A |
| 2015/0069183 | A1 | * | 3/2015 | Schlipf .................. B64D 15/12 244/129.1 |
| 2015/0136559 | A1 | * | 5/2015 | Brumberger ......... F16D 48/064 192/84.9 |
| 2015/0217707 | A1 | * | 8/2015 | Tanigaki ................ B60L 50/66 180/65.1 |
| 2015/0334882 | A1 | * | 11/2015 | Sugino ................. H02G 3/0481 29/428 |
| 2017/0005461 | A1 | * | 1/2017 | Hartwig ................ E05F 15/632 |
| 2017/0069410 | A1 | * | 3/2017 | Steinberg ............. H02G 3/0468 |
| 2017/0221601 | A1 | * | 8/2017 | Tanigawa .............. H01B 7/0045 |
| 2017/0229216 | A1 | * | 8/2017 | Inao ...................... H01B 13/012 |
| 2018/0097345 | A1 | * | 4/2018 | Inoue ................. B60R 16/027 |
| 2018/0215330 | A1 | * | 8/2018 | Takii ................... B60R 16/0239 |
| 2019/0023199 | A1 | * | 1/2019 | Nakai ....................... H01B 7/04 |
| 2019/0283807 | A1 | * | 9/2019 | Bremmer ............... B62D 21/17 |
| 2019/0375351 | A1 | * | 12/2019 | Adachi ................ B62D 5/0418 |
| 2020/0070747 | A1 | * | 3/2020 | Yamaguchi ........... H01F 17/062 |
| 2021/0251100 | A1 | * | 8/2021 | Russell ................. G11B 33/126 |
| 2022/0105790 | A1 | * | 4/2022 | Brizendine ........... F16H 57/025 |
| 2022/0190568 | A1 | * | 6/2022 | Yoshida ................ H02G 3/0475 |
| 2022/0247161 | A1 | * | 8/2022 | Strand ................. B60R 16/0215 |

FOREIGN PATENT DOCUMENTS

| | | | | | |
|---|---|---|---|---|---|
| CN | 102870301 | A | * | 1/2013 | ......... B60R 16/0215 |
| CN | 103683139 | A | * | 3/2014 | ......... B60R 16/0215 |
| CN | 104602969 | A | * | 5/2015 | ............... B60K 1/00 |
| CN | 106536235 | A | * | 3/2017 | ............... B60G 3/18 |
| CN | 104627096 | B | * | 4/2017 | ......... B60R 16/0215 |
| CN | 107845888 | A | * | 3/2018 | ......... B60R 16/0215 |
| CN | 106025660 | B | * | 6/2018 | ......... B60R 16/0215 |
| CN | 106394433 | B | * | 4/2019 | ............... B60R 16/02 |
| CN | 212073937 | U | * | 12/2020 | ............... B60K 1/00 |
| CN | 113451965 | A | | 9/2021 | |
| DE | 19948852 | C1 | * | 8/2001 | ......... B60R 16/0215 |
| DE | 10118205 | A1 | * | 10/2001 | ........... B60R 16/027 |
| DE | 10318635 | A1 | * | 12/2003 | ......... B60R 16/0215 |
| DE | 202005008668 | U1 | * | 9/2005 | ............... F16L 3/015 |
| DE | 102011009224 | A1 | * | 7/2011 | ............... F16G 13/16 |
| DE | 102010022700 | B3 | * | 10/2011 | ......... B60R 16/0215 |
| DE | 102012100533 | A1 | * | 8/2012 | ............... F16L 3/015 |
| DE | 102013101541 | A1 | * | 8/2013 | ............... F16G 13/16 |
| DE | 102013101542 | A1 | * | 8/2013 | ........... H02G 11/006 |
| DE | 202014100540 | U1 | * | 6/2014 | ............... F16G 13/16 |
| DE | 112014004656 | T5 | * | 7/2016 | ......... B60R 16/0215 |
| DE | 112014005411 | T5 | * | 8/2016 | ......... B60R 16/0215 |
| DE | 102016209883 | A1 | * | 12/2016 | ......... B60R 16/0215 |
| DE | 112017001967 | T5 | * | 1/2019 | ............. B60K 17/02 |
| DE | 202020102090 | U1 | * | 7/2021 | ............... F16L 3/015 |
| DE | 102021200455 | A1 | * | 7/2022 | |
| EP | 0260740 | A2 | | 3/1988 | |
| EP | 0287094 | A2 | | 4/1988 | |
| EP | 0490022 | A2 | | 4/1991 | |
| EP | 2295295 | A2 | * | 3/2011 | ......... B60R 16/0207 |
| EP | 2650991 | A1 | * | 10/2013 | ......... B60R 16/0215 |
| EP | 3517368 | B1 | * | 3/2021 | ......... B60R 16/0215 |
| FR | 2779800 | A1 | * | 12/1999 | ............... F16L 11/18 |
| GB | 2551731 | A | * | 1/2018 | ............... B60L 53/12 |
| IT | 1076182 | B | * | 4/1985 | ............. B66C 13/12 |
| JP | 2003348743 | A | * | 12/2003 | ......... B60R 16/0215 |
| JP | 2004142704 | A | * | 5/2004 | ......... B60R 16/0215 |
| JP | 2007092939 | A | * | 4/2007 | ............... F16G 13/16 |
| JP | 2009095207 | A | * | 4/2009 | ............. B60H 1/3222 |
| JP | 4628136 | B2 | * | 2/2011 | |
| JP | 2012139014 | A | * | 7/2012 | ................ B60K 6/28 |
| JP | 2015006051 | A | * | 1/2015 | ......... B60R 16/0215 |
| JP | 2017004862 | A | * | 1/2017 | ........... H01B 7/0045 |
| JP | 6185808 | B2 | * | 8/2017 | |
| JP | 2017140992 | A | * | 8/2017 | ............... B60K 1/02 |
| JP | 2017143709 | A | * | 8/2017 | ............... B60K 1/02 |
| KR | 20070077051 | A | * | 7/2007 | |
| KR | 20080009631 | A | * | 1/2008 | |
| KR | 20160057316 | A | * | 5/2016 | |
| TW | 201425762 | A | * | 7/2014 | ............... F16G 13/16 |
| WO | WO-9746773 | A1 | * | 12/1997 | ............ H02G 3/0475 |
| WO | WO-2008053938 | A1 | * | 5/2008 | ......... B60R 16/0215 |
| WO | WO-2012026272 | A1 | * | 3/2012 | ......... B60R 16/0215 |
| WO | WO-2012032796 | A1 | * | 3/2012 | ......... B60R 16/0207 |
| WO | WO-2012043038 | A1 | * | 4/2012 | ......... B60R 16/0215 |
| WO | WO-2012096011 | A1 | * | 7/2012 | ......... B60R 16/0215 |
| WO | WO-2013113408 | A2 | * | 8/2013 | ............... F16G 13/16 |
| WO | WO-2013125063 | A1 | * | 8/2013 | ......... B60R 16/0215 |
| WO | WO-2013125679 | A1 | * | 8/2013 | ......... B60R 16/0215 |
| WO | WO-2013162070 | A1 | * | 10/2013 | ......... B60R 16/0215 |
| WO | WO-2014034899 | A1 | * | 3/2014 | ......... B60R 16/0215 |
| WO | WO-2015046078 | A1 | * | 4/2015 | ......... B60R 16/0215 |
| WO | WO-2015080024 | A1 | * | 6/2015 | ......... B60R 16/0215 |
| WO | WO-2016142048 | A1 | * | 9/2016 | ......... B60R 16/0215 |
| WO | WO-2017068630 | A1 | * | 4/2017 | ........... H01B 7/0045 |
| WO | WO-2020137614 | A1 | * | 7/2020 | ............... B60K 1/04 |

* cited by examiner

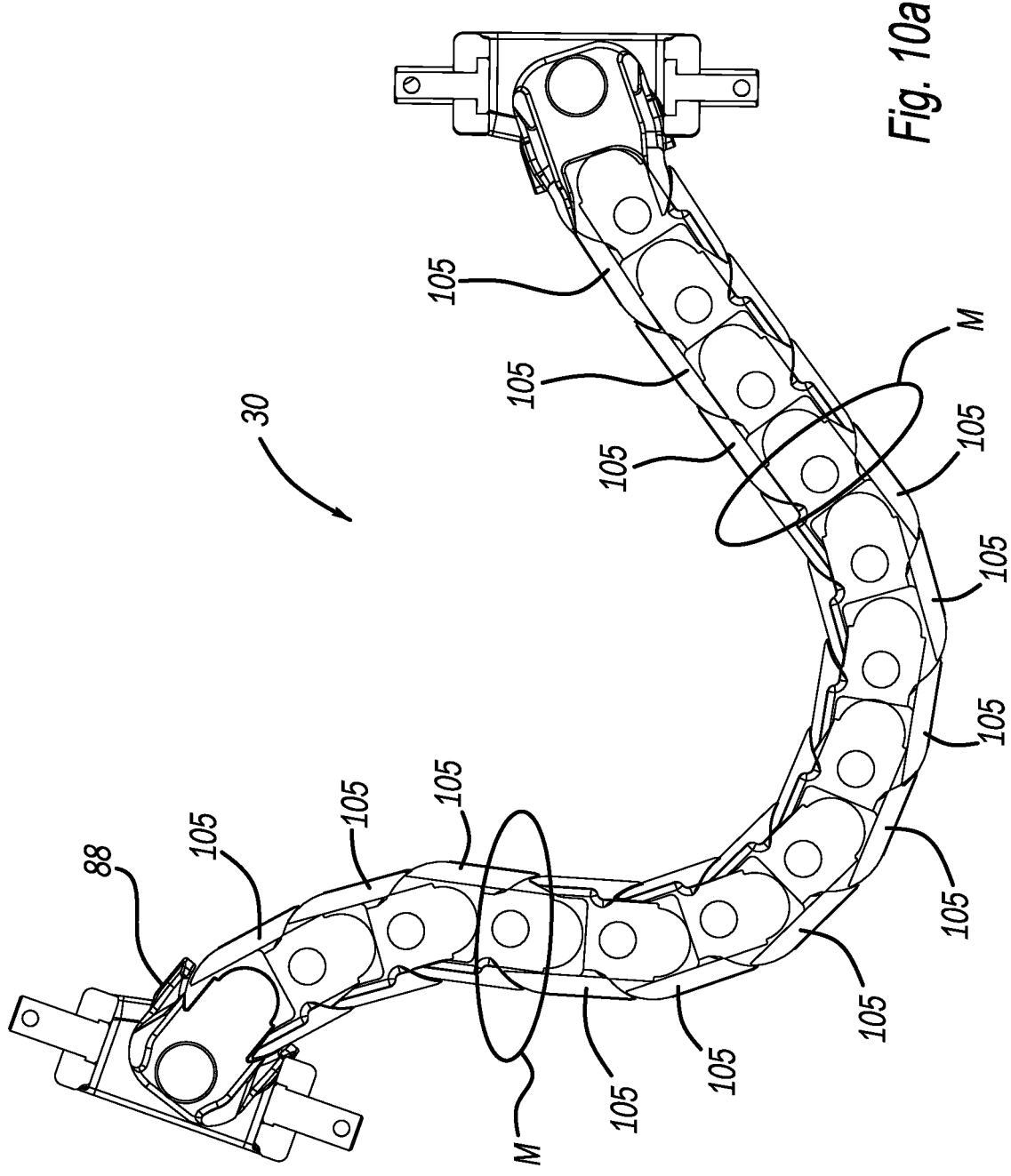

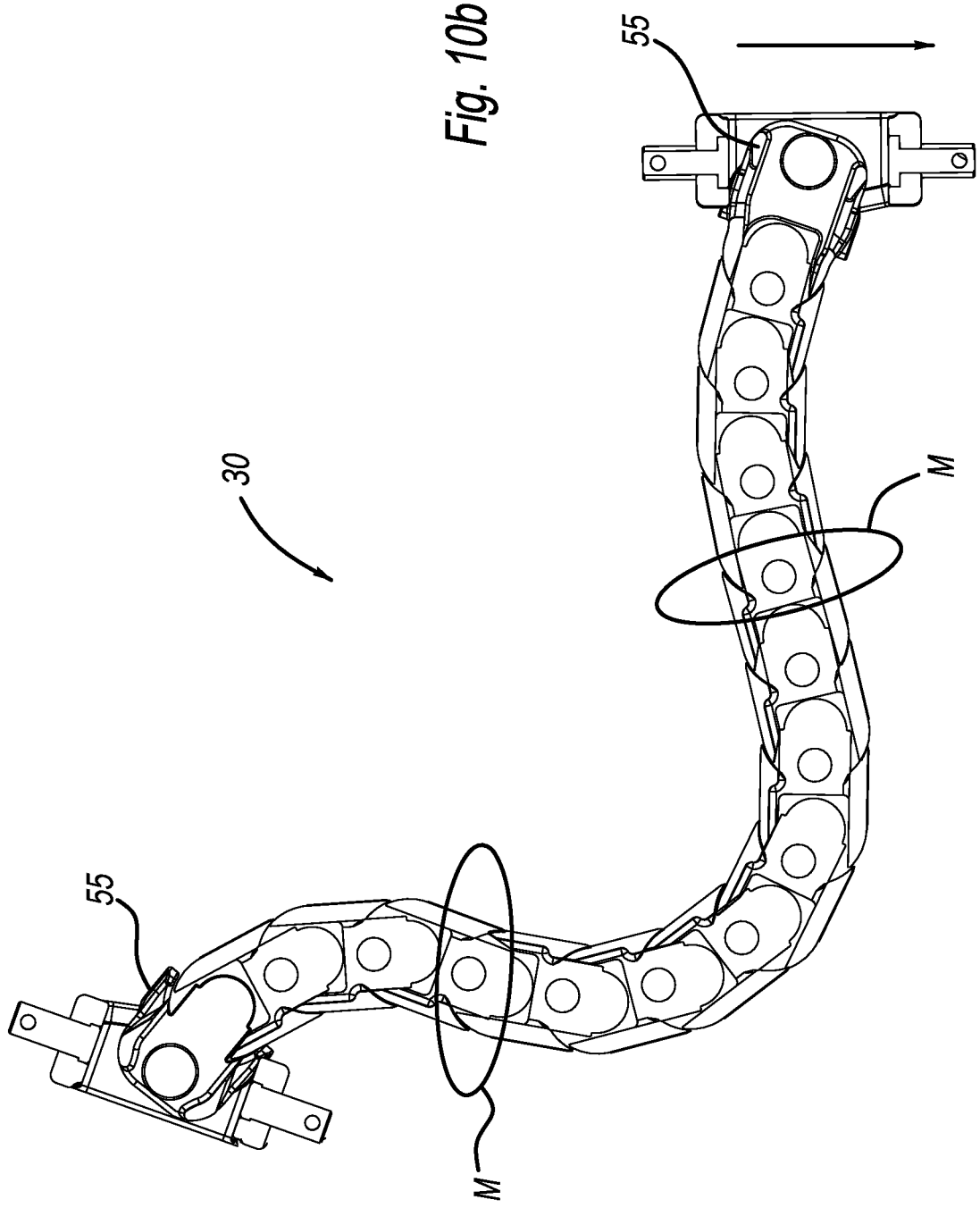

HIGH VOLTAGE WIRE PROTECTION SYSTEM FOR ELECTRIC VEHICLES

FIELD OF THE INVENTION

The present disclosure is generally related to a wire protection system for an electric vehicle, more specifically, where the inverter is fixed in position and the electric motor is mounted in an axle which moves relative to the inverter based on the vehicle suspension travel.

BACKGROUND OF THE INVENTION

This section provides background information related to the present disclosure which is not necessarily prior art.

Electric drive axles include at least one electric motor which provides power to drive first and second vehicle wheels. An inverter is required to control the frequency of alternating current to the motor from power supplied by the battery pack. Typically, inverters are mounted near the electric motor, often fastened directly to the housing of the axle containing the electric motor. In this arrangement there may be high voltage wires between the inverter and the electric motor, but there is very minimal movement between the components. In other arrangements connection is made between the inverter and motor without any external wiring.

Electric vehicles often utilize a vehicle design where the battery, inverter, and electric motor are mounted to the frame or body structure of the vehicle, while a suspension system and halfshafts are positioned between the motor or gearbox's output and the vehicle's wheels to allow movement based on the road or terrain while transmitting the power to the wheels. This arrangement is often seen in cars and SUVs but not in body on frame pickup trucks or larger delivery vehicles due to limited load carrying capacities.

To overcome the load carrying capacity, beam axles have been utilized for many years, particularly powered by an internal combustion engine and more recently adapted to be driven by an electric motor integrated into the beam axle. Difficulty arises when determining where and how to position the inverter based on a few reasons. First is the beam axle, due to its movement in relation to the road or terrain can see extensive vertical travel relative to the vehicle frame or body. Also, there are high loads transmitted into the axle as no suspension exists between the axle and the wheel to absorb impact loads. This can be damaging to the electronic circuitry within the inverter. Mounting the inverter directly onto the beam axle also is difficult due to limitations in space relative to other vehicle components, especially when the range of motion of the beam axle is considered. The inverter also requires cooling complicating an arrangement where the inverter is mounted on the beam axle as flexible, durable hoses would be required For these reasons, mounting the inverter to the body or frame of the vehicle for an electrically driven beam axle application is the most advantageous solution. Due to this arrangement, three heavy gauge wires are required to transmit power from the inverter to the motor. These wires need to have enough slack to allow motion between the fixed inverter and the moving beam axle and motor, but be supported and protected from various operational conditions.

Thus, there is a need to provide a solution to prevent damage to this wiring when there is continual relative movement between the inverter and an electrically powered beam axle.

SUMMARY OF THE DISCLOSURE

This section provides a general summary of the disclosure and is not intended to be considered a comprehensive listing of all of its aspects, features, and objectives.

The present disclosure is related to limiting the allowable movement of the wires to prevent damage by ensuring the bend radius of the wire remains above the minimum design requirement, providing impact protection from debris, and providing strain relief at a fixed connection point at both ends of the wire.

It is an aspect of the present disclosure to provide a wire protection system which will ensure the bend radius of the wire is maintained above a minimum threshold to prevent damage.

It is a related aspect of the present disclosure to provide wire protection components specifically designed to limit the wire's movement more than if no restrictive components were included.

It is a related aspect of the present disclosure for the wire protection system to be designed to limit the wire movement specifically in at least one axis based on components positioned towards the ends of the wire.

It is a related aspect of the present disclosure for the wire protection system to have features to provide limits on wire movement between the support points at each end of the wire.

It is another related aspect of the present disclosure to provide components which integrate strain relief at the end of the wire.

It is another related aspect of the present disclosure to provide some level of impact protection to the wires from environmental conditions during vehicle operation.

In accordance with these and other aspects, a wire protection system for use in electrically powered motor vehicles where relative motion occurs between the inverter and motor mounted within a beam axle is provided. The beam axle during its operation will move above and below relative to the fixed position of the inverter in multiple directions and this motion can also result in extensive motion of the wire. The beam axle may rotate about the axle central axis depending on vehicle acceleration as well as pivot about the central portion of the axle depending on the terrain.

The wire protection system as disclosed shows three sub-assemblies working together to provide the highest level of protection to the wire. The first sub-assembly is located on the inverter side of the wiring. This first sub-assembly comprises of a rigid mounting structure connected to the inverter housing with a pivoting joint between the rigid mounting structure and a collar on a first axis. This collar has a second pivoting joint attached to a cable shroud on a second axis. Features are included to limit the relative motion between these components in these two axes. A strain relief is provided to the wire integral to the first sub system components. A second sub-assembly has a similar collar with a pivoting joint between the collar and cable shroud on a first axis. An additional pivoting joint is positioned on a second axis between the collar and the structure which functions as a strain relief clamp and is mounted to the housing of the axle. In between these first and second sub-assemblies are multiple cable shrouds snapped together which allow motion in one axis but include features which limit the overall amount of travel relative to each other to some degree. Dependent on the clearances between the linkage walls and pins, some twisting of the central link section may occur. Using these designs together provides limitations to the bending of the wire during relative travel between the fixed inverter and the electrified beam axle.

As the wire is positioned inside the collar and shroud components, these components provide further protection to the outside of the wire. This damage can be from debris kicked up from the road or from contact with the road surface in off road conditions. Debris could cause impact or abrasions if directly in contact with the wire, but the protection system surrounding the wire would instead be contacted allowing the wire to be unscathed.

These and other features and advantages of the present invention will become more readily appreciated when considered in connection with the following detailed description and appending drawings.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 10a is a cross-sectional side view of the wire protection system shown in FIG. 8 in a position where the electric beam axle is in a normal ride height operating position FIG. 10b is a cross-sectional side view of the wire protection system shown in FIG. 8 in a position where the electric beam axle is at its lowest position relative to the inverter due to the suspension being in a full rebound operating position;

DETAILED DESCRIPTION OF THE PREFERRED EMBODIMENTS

Example embodiments will now be described more fully with reference to the accompanying drawings. In general, each embodiment is directed to wire protection system that is utilized between an inverter which is fixed to the body or frame of a vehicle and an electric axle which has significant movement relative to the inverter.

Figure 1:
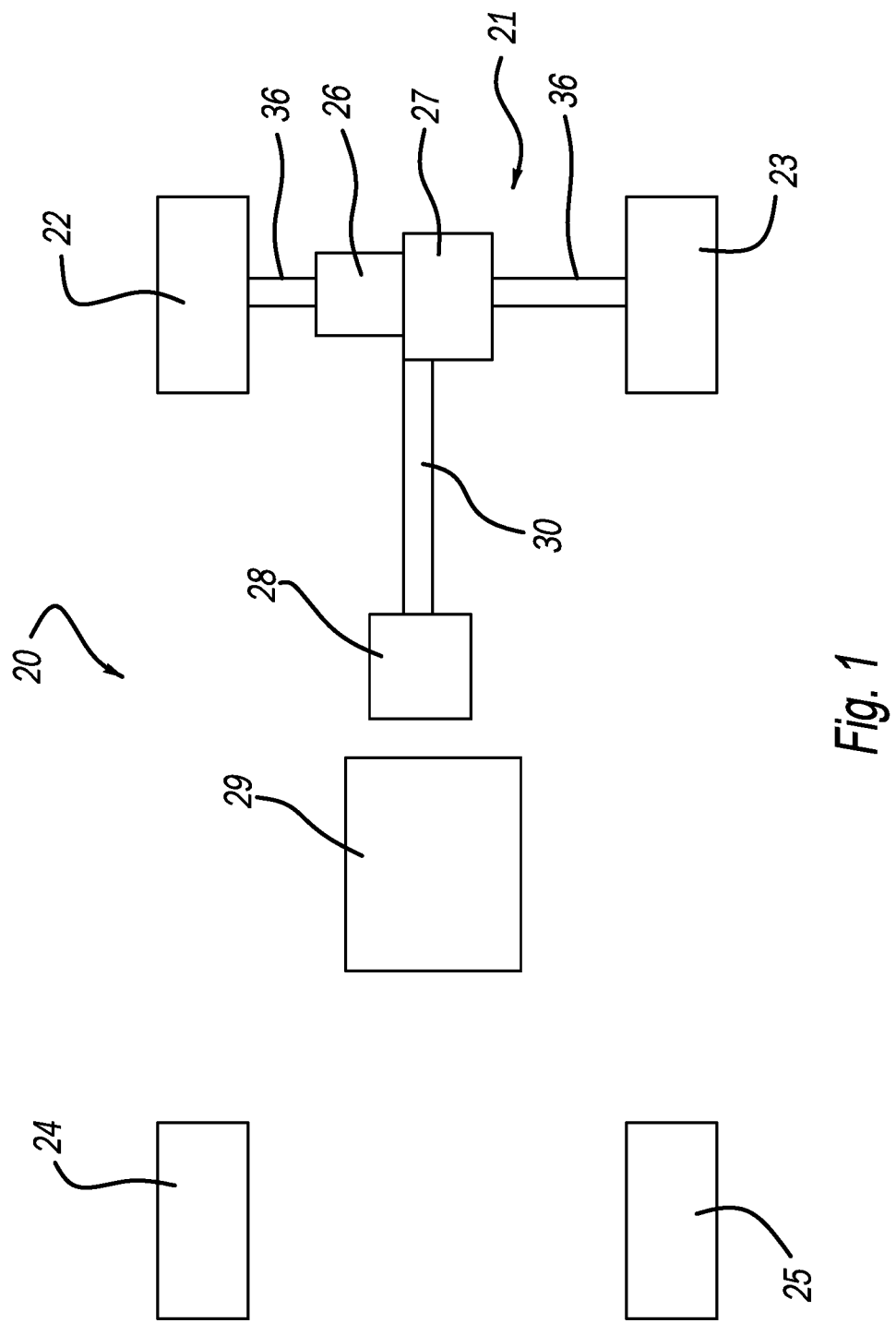
FIG. 1 is an overview of the vehicle layout providing reference of the location of the electric beam axle.

With particular reference to FIG. 1 of the drawings, an electric vehicle 20 is shown schematically in a rear drive configuration, propelled by power transferred thru an electric axle 21 to both right rear wheel 22 and left rear wheel 23. The vehicle further has a right front wheel 24 and left front wheel 25, which in this version is not powered but can be in other vehicle configurations. In this vehicle, the electric axle 21 is considered a beam axle providing propulsion and supporting structure for the vehicle. The electric axle 21 also includes an electric motor 26 and a gearbox 27 and is positioned and suspended below the body of the vehicle 20 by a suspension (not shown). Axle tubes 36 are positioned between the central section of the axle and the wheel ends. An inverter 28 is mounted to the frame or body of the vehicle in a fixed position relative to the battery 29. Wires, not explicitly shown in the diagram of FIG. 1, transmit electrical power between the inverter 28 and the axle 21. Due to the suspension movement between inverter 28 and the electric axle 21 over variable road conditions, movement of the wire(s) is required, which may cause damage if left unprotected. Therefore, a wire protection assembly 30 is utilized to support and prevent damage to the wiring.

Figure 2:
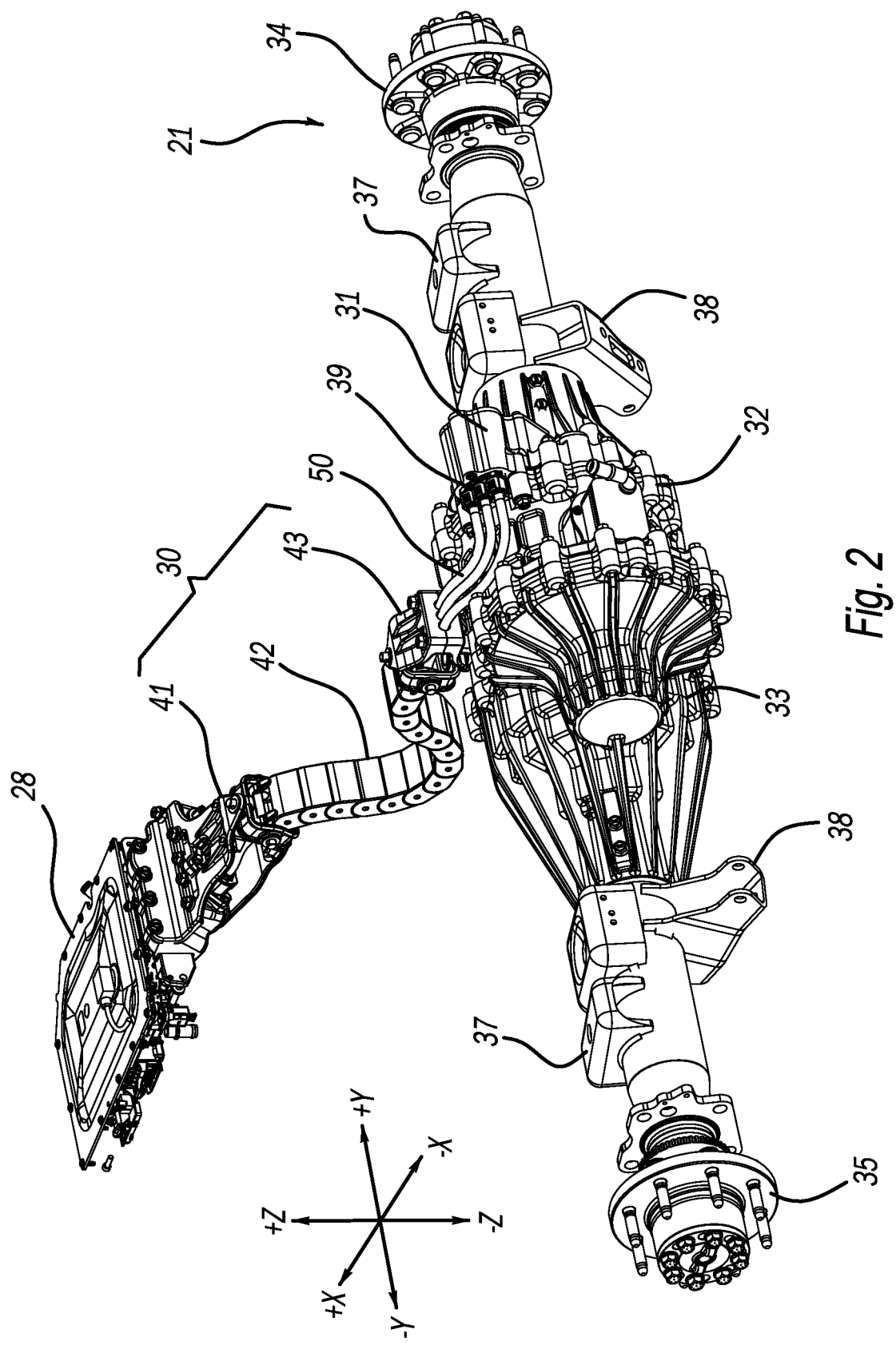
FIG. 2 is a view of the powertrain comprising the inverter, wire protection system and electric beam axle.

With particular reference to FIG. 2 of the drawings, the electric beam axle 21, wire protection system 30 and inverter 28 are shown in detail. It will be appreciated that the detailed representation illustrated in FIG. 2 may be applicable to various other similar arrangements. The electric beam axle 21 comprises a center portion with the electric motor 26 and gearbox 27. The electric motor 26 is mounted internally to the first electric motor housing 31 and a second electric motor housing 32. Power is transferred from the output of the electric motor, thru a transmission and differential to provide a speed reduction. These components are not shown as they are out of view and surrounded by the gearbox housing 33. Axle shafts distributing power to the right rear wheel 22 and left rear wheel 23 are internal to the axle tube and supported by bearings internally at the wheel ends. The flange portion of the right axle shaft 34 and left axle shaft 35 can be seen. These axle shafts are surrounded by axle tubes which are fixed in connection to the electric motor housings 31 and 32 and gearbox housing 33. The axle tubes allow attachment points and supporting structure for the suspension including pads 37 where leaf springs mate and shock mounting brackets 38. On the top of the first electric motor housing a connector 39 is positioned to secure, seal and ground the wires 50 as they enter the first electric motor housing 31, further connecting to the motor 26 internally. The inverter 28 is mounted in a protected and fixed location on the vehicle, away from the beam axle 21. Between the inverter 28 and the axle 21 is the wire protection system 30. This overall system 30 includes an inverter end portion 41 of the wire protection system, center links portion 42, and an axle end portion 43 of the wire protection system. Specific features and functions will be further described in later figures.

Referring still to FIG. 2, during operation of the vehicle, the beam axle 21 will move in various directions, dependent on road conditions and torque applied by the electric motor. These forces on the axle 21 will result in relative motion of the beam axle 21 relative to the inverter 28. For instance, as the suspension jounces and rebounds, the beam axle 21 will travel in the Z axis shown in FIG. 2. If there are uneven height surfaces between the right rear wheel 22 and left rear wheel 23, the beam axle 21 will rotate about the X axis as shown in the figure, where one side of the axle 21 is raised along the Z axis and the other side is lowered along the Z axis (relative to each other). During hard acceleration the axle 21 will attempt to rotates against the suspension system fixed to spring pads 37 and shock mounts 38, about the Y axis. Furthermore, the space between the inverter 28 and axle 21 is open and exposed to the road surface below, which may result in rocks or other debris entering the space between and impacting the wires 50 directly if there is no protection. This contact with the wires may cause arcing if the wire insulation is damaged, and/or incorrect motor operation if the conductors inside the wire are damaged. These motions on the axle 21 will impart forces and motion on the wires 50 connected thereto and, if left unsupported or allowed to twist and bend without restriction, this motion may result in damage to the wires 50.

Figure 3:
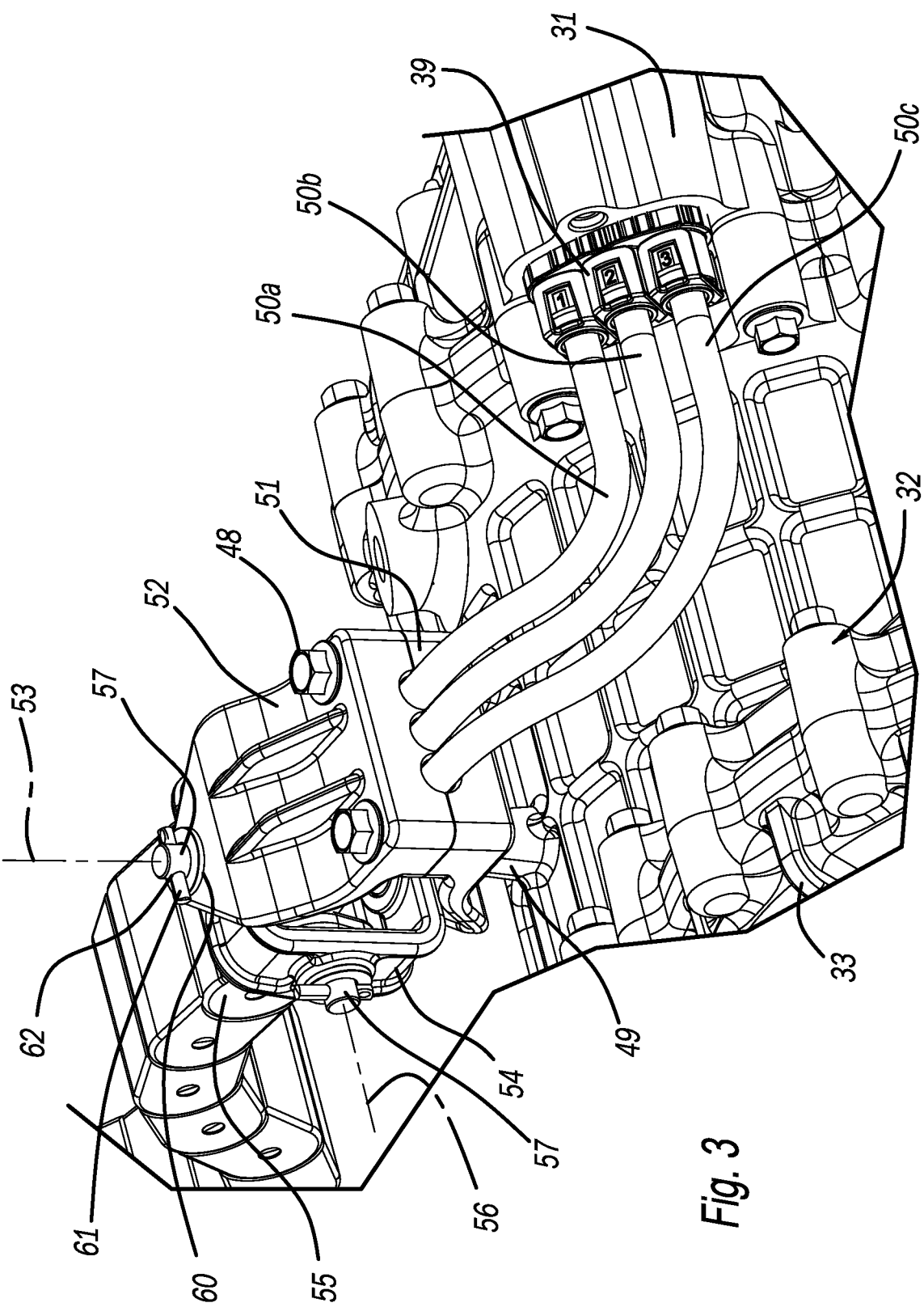
FIG. 3 is view of the wire protection end on the electric beam axle side from the rear.

With particular reference to FIG. 3, the axle end portion 43 of the wire protection system can be seen in more detail, viewed from the rear of the vehicle. Across the bottom of the view of FIG. 3 the central portion of the axle 21 can be seen, made up of the first electric motor housing 31, second electric motor housing 32 and gearbox housing 33, which are fastened together. An improved view of the interface of the electric connector 39 fixed to the first electric motor housing 31 can be seen. The connector 39 provides a rigid connection for the three conductors of wire 50 to the first motor housing 31. Each conductor is in the form of a single wire 50*a*/50*b*/50*c* traveling uninterrupted from the motor to the inverter 28, with a connector 39 at each end. After a fixed radius, the wire conductors 50 enter the axle end portion 43 of the wiring protection system. The wires 50 are supported and fixed positionally relative to the axle 21 by the combination of the lower mounting block 51 and the upper mounting block 52. The upper block 52 and lower block 51 are fixed to the second motor housing 32 by fasteners 48 threaded into housing bosses 49. The purpose of these mounting blocks 51, 52 is to provide strain relief to the wires 50 and provide a mounting point for the vertical axis joint at the end 43 of the wire protection system 30. As shown, a collar 54 is able to pivot about a vertical axis 53 and includes features to allow a second degree of motion between the collar 54 and the termination link 55 about the horizontal axis 56. Thus the collar 54 is moveable about two axes relative to the fixed mounting blocks 51, 52. The collar 54, upper block 52, lower block 51, and terminating link 55 (of the plurality of links) are connected using stub shafts 57 (one vertical at axis 53 and another horizontal at axis 56). This allows free motion about each given axis previously described. The stub shaft 57 is placed thru the collar 54 and terminating link 55 or collar 54 and mounting blocks 51 and 52. A washer 60 is placed to provide a surface for the pin 61 to ride against, which is inserted into a hole 62 at the end of the stub shaft 57. Other solutions such as deforming the end of the stub shaft or having a threaded end with a nut and washer could be utilized, as long as they hold the stub shaft 57 in position and allow free rotation about the particular axis.

Figure 4:
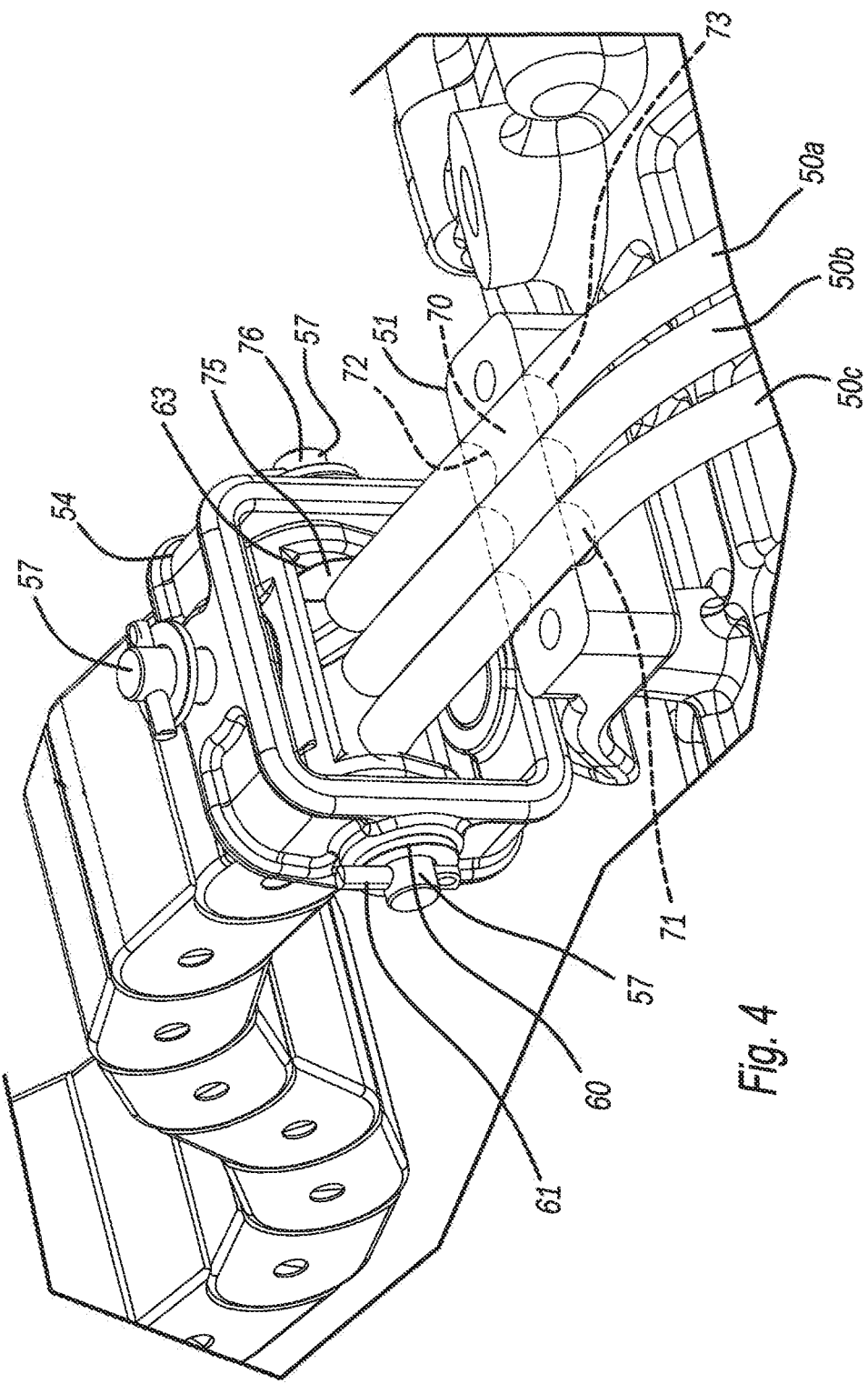
FIG. 4 is a view similar to FIG. 3 but with the upper strain relief block removed.

With particular reference to FIG. 4, the upper mounting block 52 has been removed from view. This allows detail of the wire strain relief feature 70 of the lower block 51. This includes a semi-circular relief 71 designed into the lower block 51. This semi-circular relief 71 which is consistent in size from the front 72 of the block to the rear 73 of the block, but has a slightly smaller diameter than the outer diameter of the wire conductor 50*a-c*. A similar relief is also disposed in the upper block 52. This sizing and arrangement allows the wire conductors 50*a*-c to be laid in the relief 71 prior to installing the upper block 52. Once the upper block 52 is installed, due to the interference fit dimensioning of the relief feature diameter 71, the blocks 51, 52 will tightly surround and grip the insulation of the wire conductors 50*a-c* and hold them in position relative to the electrical connector 39. In the view of FIG. 4, the collar 54 and termination link 55 can be better seen. Each of the four stub shafts 57 can be seen providing support but allowing a pivoting motion of the collar 54 or terminating link 55 about either the horizontal 56 or vertical 53 axis. The stub shaft 57 in this embodiment is made of a wider diameter head 75 which is pressed into the collar 54 or terminating link 55 and a smaller cylindrical portion 76 away from the head 75. The wider diameter head 75 provides a positioning limit holding the collar 54 and the terminating link 55 closely together but with some clearance to allow a freely pivoting motion. As described earlier, a washer 60 and pin 61 are used as the second positioning limit at the smaller cylindrical portion 76 of the stub shaft 57.

Figure 5:
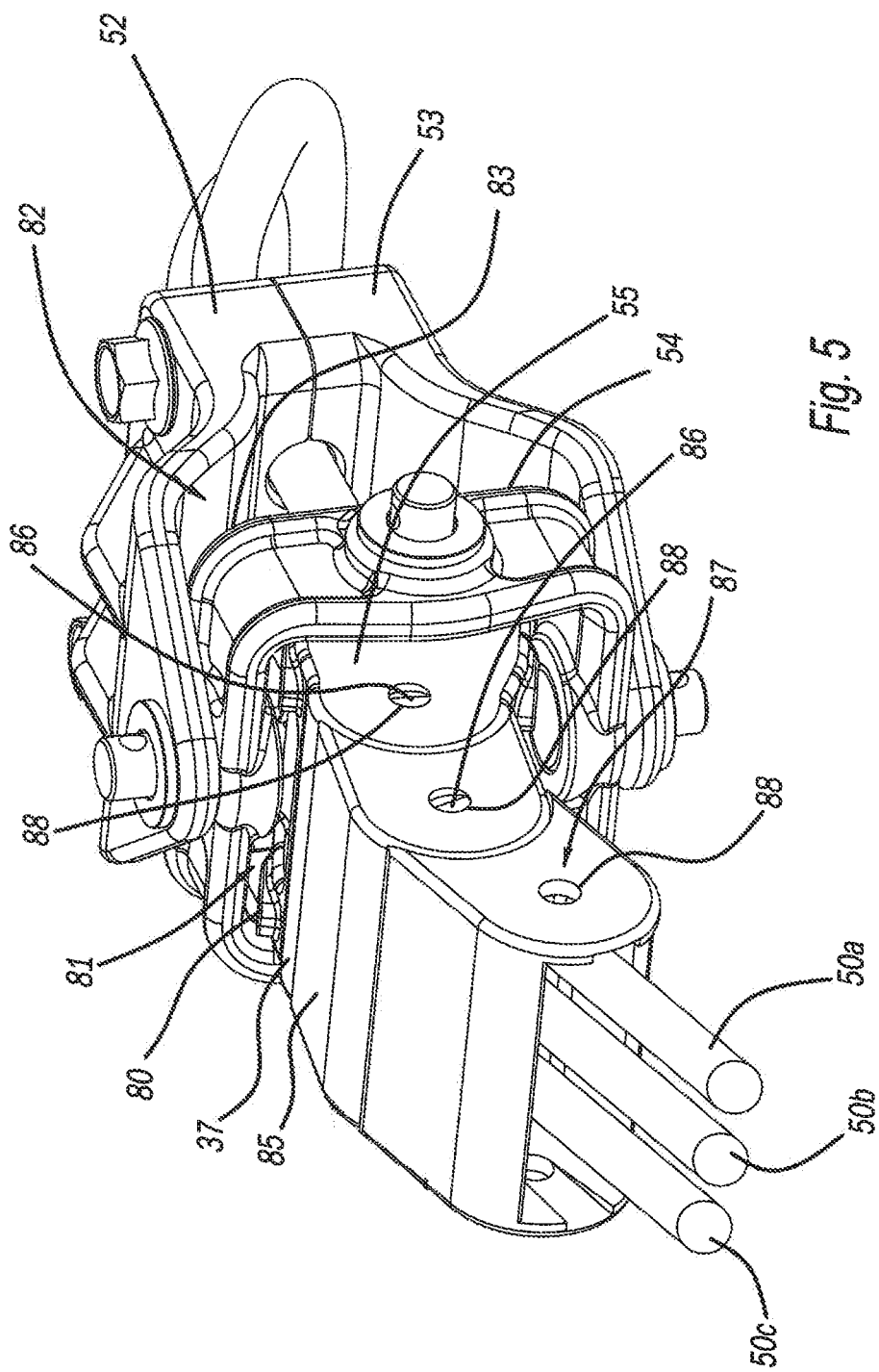
FIG. 5 is a view of the wire protection end on the electric beam axle side looking from the front.
Figure 6:
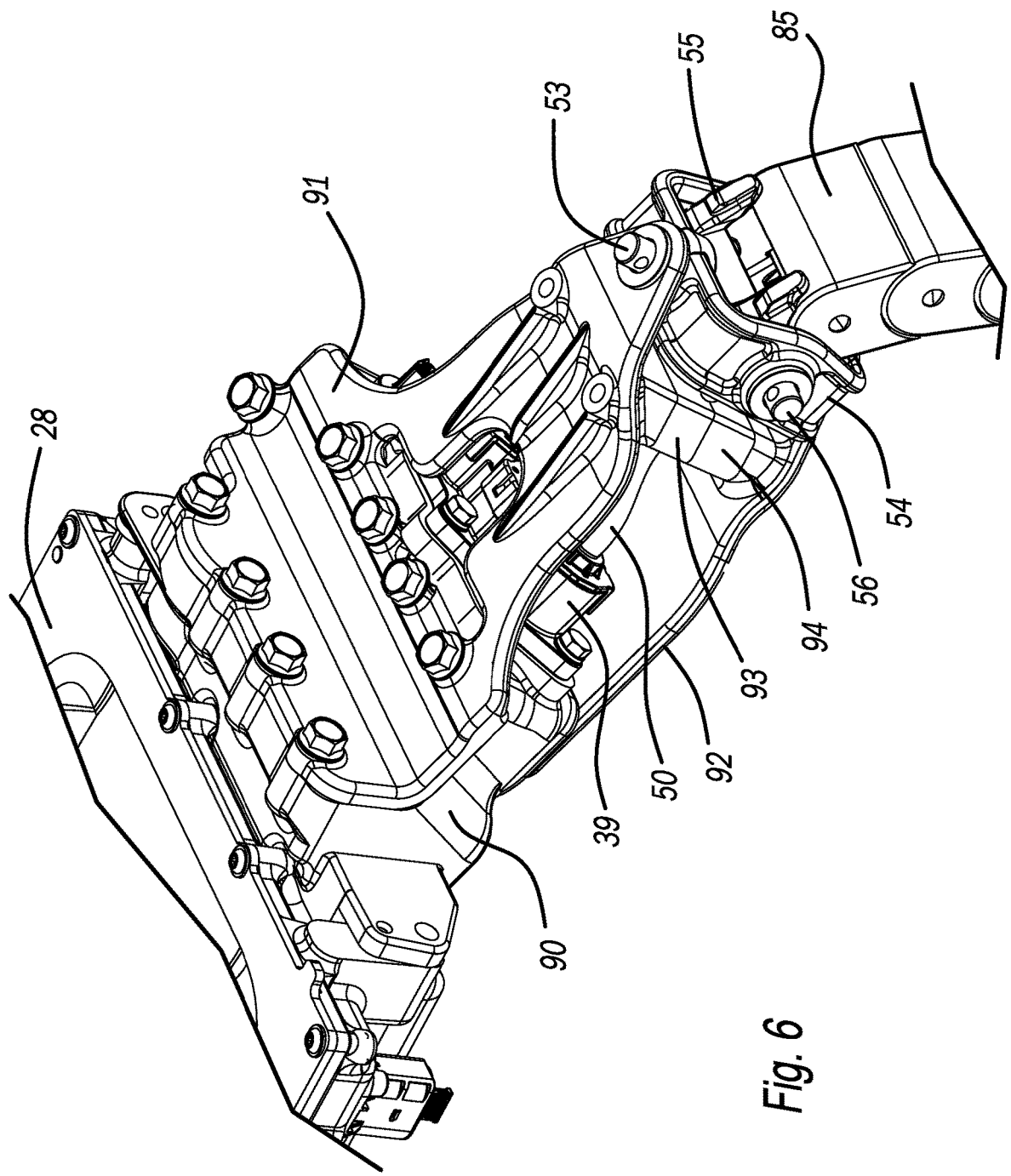
FIG. 6 is a view of the wire protection end on the inverter side.

With particular reference to FIG. 5, the axle end portion 43 of the wire protection system is again shown but now viewed from the front side of the vehicle, looking rearward. This view provides an improved view of the pivoting ability of the collar 54 relative to the fixed lower block 51 and upper block 52 about the vertical axis 53. The second pivoting motion of the terminating link 55 about the horizontal axis 56 is also seen, with the terminating link 55 positioned in the furthest downward rotated position. In this position, the stop pad 80 formed into the top surface of the terminating link 55 can be seen. This stop pad 80 provides a limit in travel upwards, as contact will be made between the stop pad 80 and the collar 54 at surface 81. A stop pad 80 is positioned at the same dimension on each side of the terminating link 55 to distribute the load and provide an even travel side to side. Similar stop pads are utilized on the bottom surface of the terminating link 55 to limit downward rotation. The same type of limiting feature could be added on the vertical axis between the collar 54 and the blocks at position 82. It is not specifically shown in this example, but the positioning of the limiting features for the vertical axis could also be at position 83 on the surface of the collar and 82 on the surface of the upper block. FIGS. 5 and 6 also show central links 85 connected in a manner which allows a pivoting motion of the central links 85 relative to the terminating links 55. This central link 85 has a pin feature 86 on the outer surface 87 which is positioned into a hole 88 on the terminating link 55 to provide connection. Pins 86 are also received in holes 88 of the chained central links 85. This connection aligns each link together, but allows rotational movement between each of the central links 85. Similar connecting features are seen on additional links of the same design, allowing connection of additional central links. These central links 85 fully surround the wire 50 providing protection and have features which control the bending radius which will be further described in later figures.

With particular reference to FIG. 6, the inverter end portion 41 of the wire protection system is shown. The inverter is fixed to a frame or other structure component of the vehicle 20, but is not specifically shown. Inverter housing 90 provides the structural connection for upper bracket 91 and lower bracket 92. These brackets 91, 92 provide the rigid mounting points for the inverter end portion 41 of the wire protection system. The same wire conductors 50*a-c* as previously described extends thru the wire protection system 30 and terminates at the inverter 28 with the same type of electrical connector 39 as on the axle side, fixing tightly to the inverter housing 90. The lower bracket 92 provides features for two connections. The first is for an upper strain relief block 93 and a lower strain relief block 94 (similar to blocks 51, 52). The second is support structure for the connected components which pivot about the vertical axis 53. The upper strain relief block 93 and the lower strain relief block 94 provide the same functions as described for upper mounting block 52 and lower mounting block 51 described earlier on the axle side, securely clamping the wires 50 and holding them in a fixed position via interference fit with reliefs formed in the blocks 93, 94. Features related to positioning stub shaft 57, providing a vertical axis 53 pivoting point for collar 54, are provided in the upper bracket 93 and lower bracket 94 in this embodiment. Depending on inverter housing design, the strain relief features and the mounting features for the vertical axis 53 could be combined, similar as seen in the axle end portion upper and lower blocks 51, 52. The collar 54, terminating link 55, and central links 85 have the same functionality and design as those described for the axle end portion of the wire protection system. This includes providing restricted rotational movement in the horizontal 56 and vertical axis 53 thru use of stop pads 80 and the connecting features of the stub shaft 57, washer 60, and pin 61. The central links 85 are shown, with the first one connecting to the terminating link 55 and additional central links 85 connected to each other to complete a protected and motion restricting feature around the wire conductors 50. At this end, terminal link 55 may include a pin, similar to 86, that is received in hole 88 of adjacent central link 85.

Figure 7:
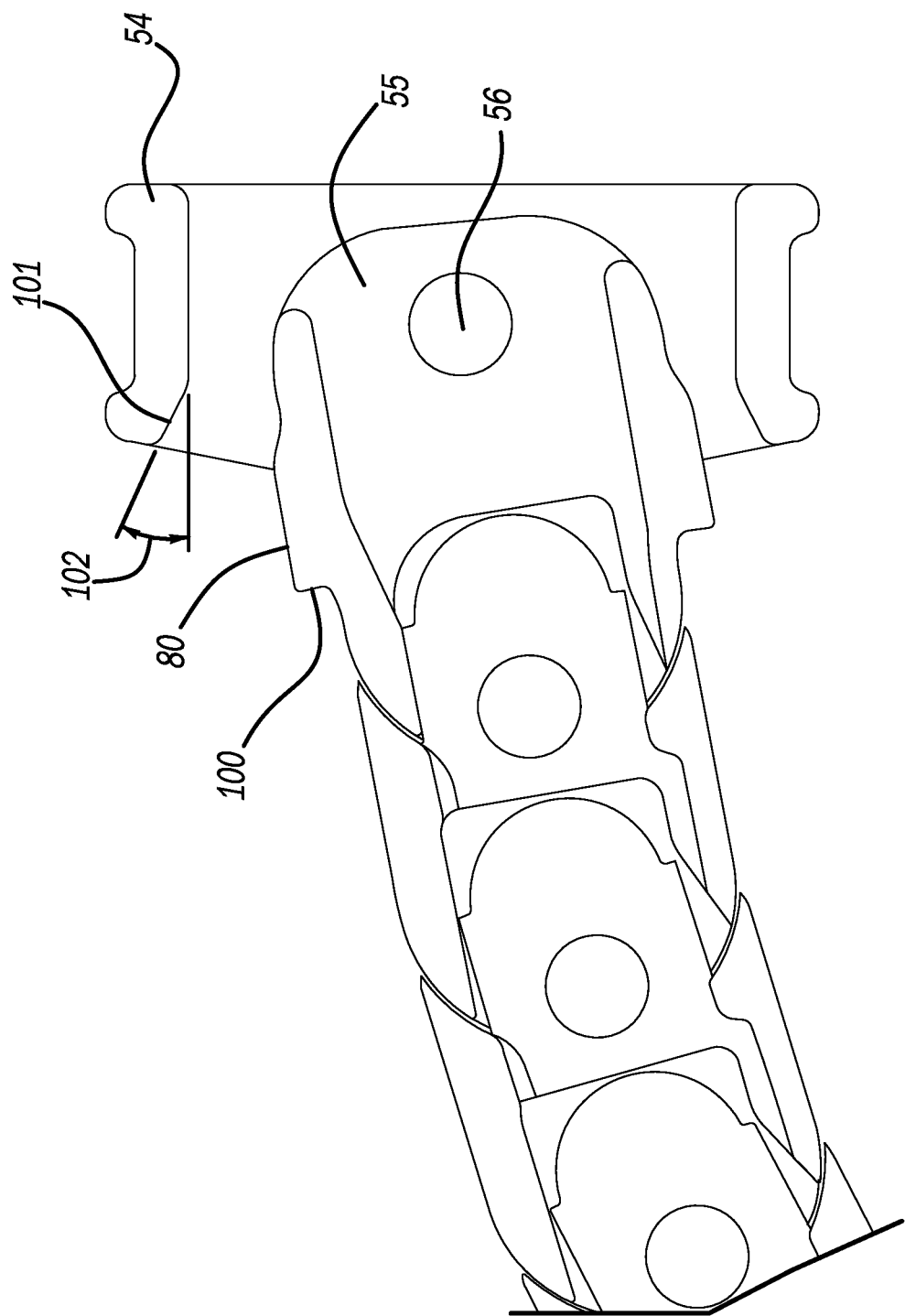
FIG. 7 is a section of the wire protection end sectioned to better show the restrictive features to control movement in the Y axis direction.

With particular reference to FIG. 7, a cross section is shown taken slightly off center to show the features of the stop pad limiting feature 80 on the termination link 55. The terminating link 55 is shown, which is capable of pivoting clockwise and counter clockwise about the horizontal axis 56. Stop pad 80 can be seen on the top and bottom of terminal link 55. The height 100 of the stop pad can be adjusted to control the degree of rotation up and down. A counteracting surface 101 is provided on collar 54. This surface 101 may be disposed on the upper and lower portion of collar 54. The surface 101 is positioned at a particular angle 102 to allow a flat face 103 on the terminating link 55 to fully contact the stop pad 80 to limit motion based on requirements of the application.

Figure 8:
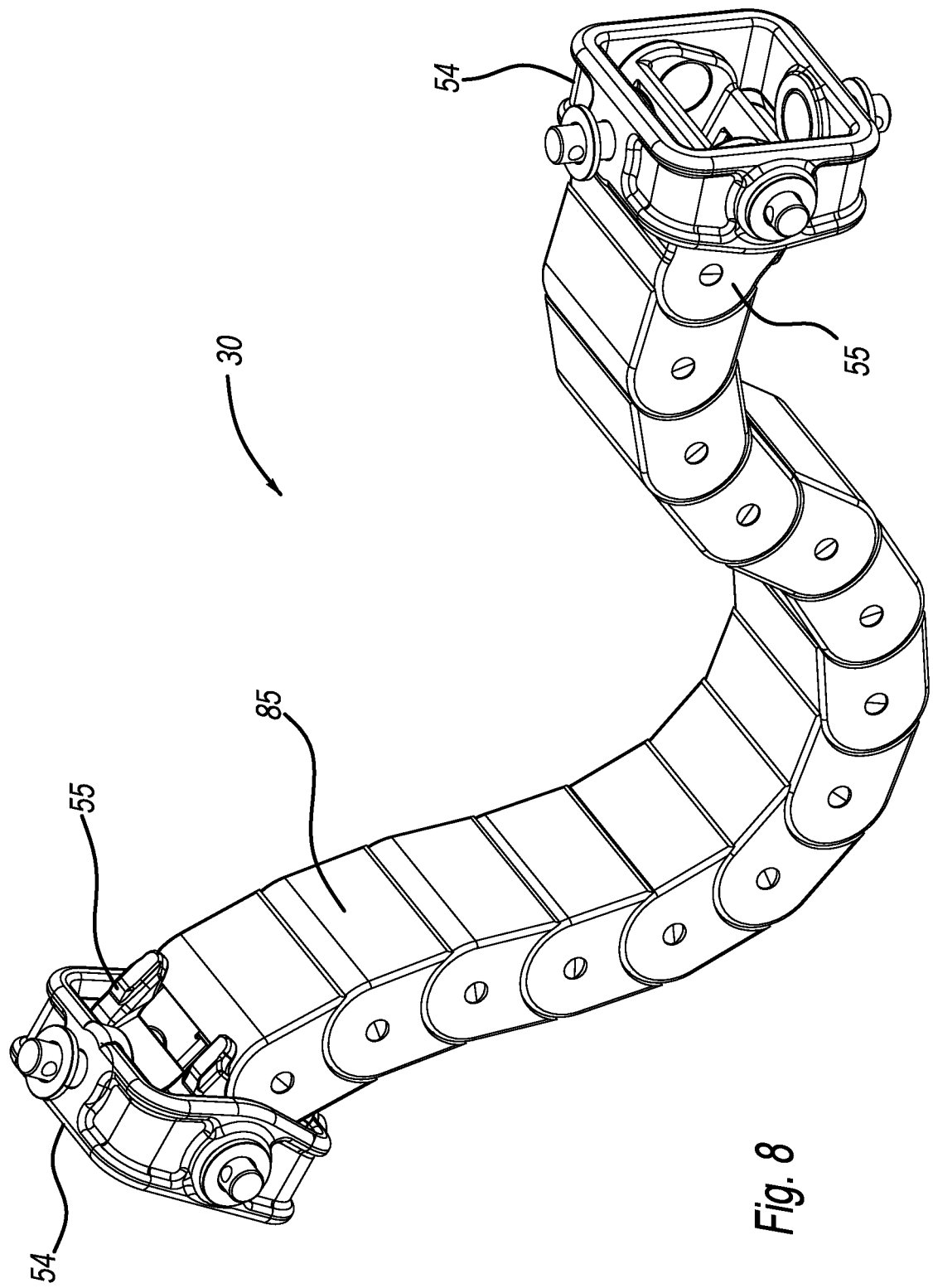
FIG. 8 is a view of the overall wire protection system

With particular reference to FIG. 8, an isometric view of the wire protection system 30 can be seen. In particular, several central links 85 are shown providing connection from the terminating link 55 on the axle side to the terminating link 55 on the inverter side.

Figure 9:
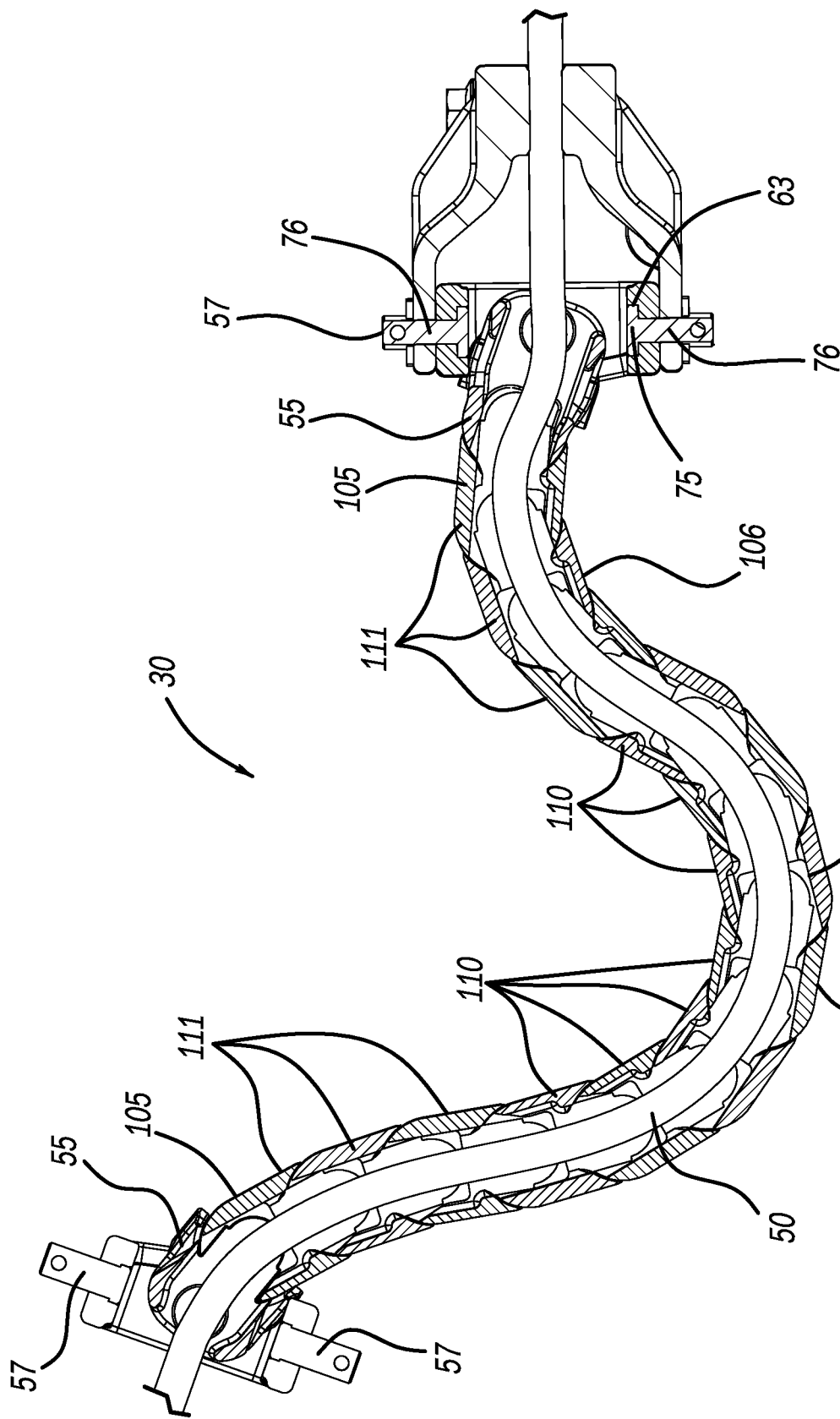
FIG. 9 is a sectioned view of the wire protection system showing the link arrangement and wire laid in protective links.
Figure 10C:
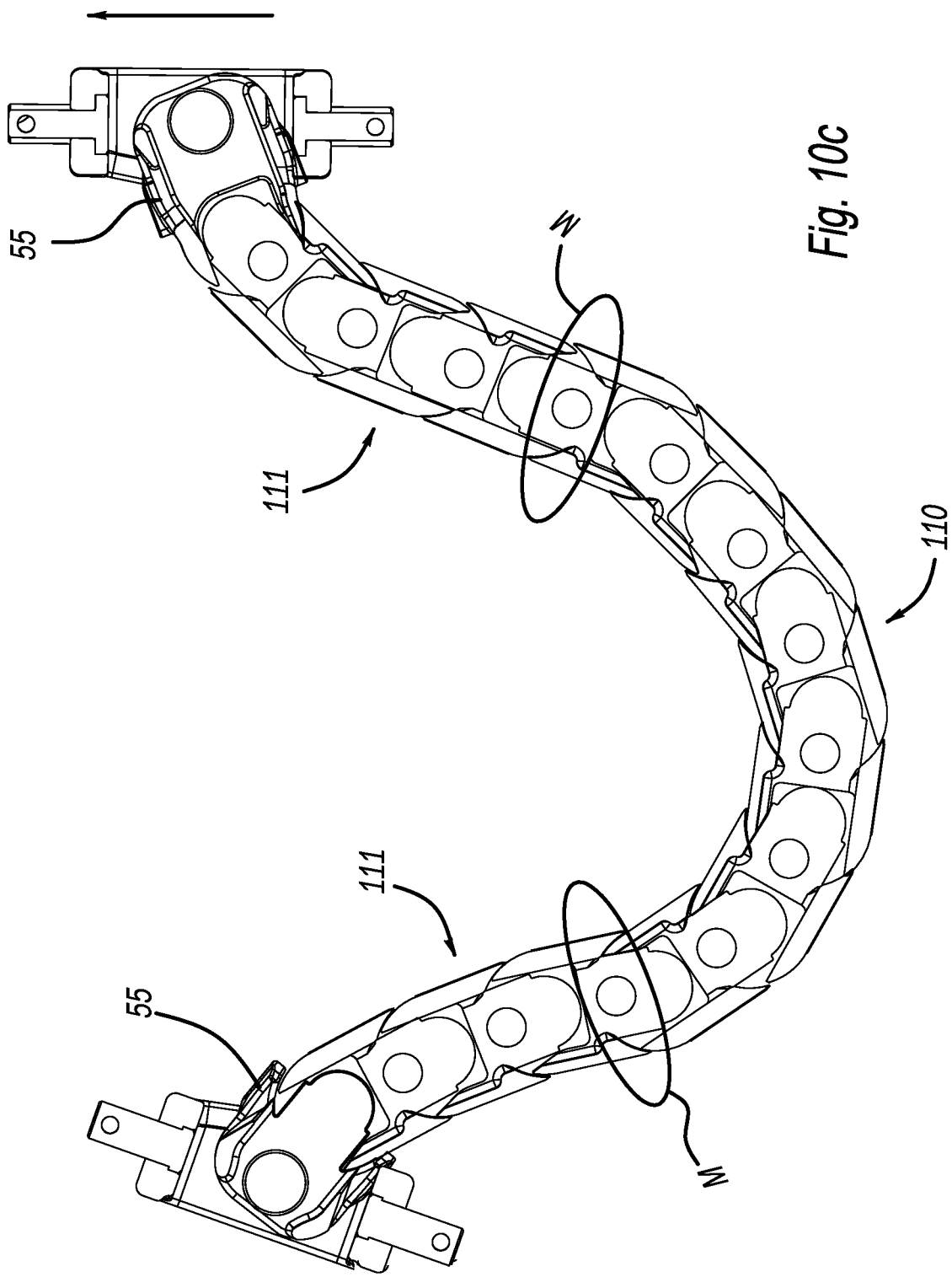
FIG. 10c is a cross-sectional side view of the wire protection system shown in FIG. 8 in a position where the electric beam axle is at its highest position relative to the inverter due to the suspension being in a full jounce operating position.

With particular reference to FIG. 9, a cross section of the wire protection system 30 is shown from FIG. 8. In this view the design of the stub shafts 57 can be better seen, showing the wider diameter head 75 which is pressed into a circular recess 63 in the collar 54 and a smaller cylindrical portion 76. Also in this view the wire 50 is now laid in the wire protection system 30. In this particular embodiment, thirteen central links 85 are used to connect between the termination links 55. Note the central links 85 are all of the same design, but are positioned in two orientations. These central links are connected to each other using the pin 86 on the outer surface which is positioned into a hole 88 on the adjacent central link to provide a connection which allows a pivoting motion between each link in the generally horizontal axis defined by the pins 86. Internal to the links 85 are features which restrict the amount of rotation allowed between each link about the horizontal axis. The amount of twist or deflection from link to link can be adjusted based on the dimensions of the pins 86 and holes 88. The amount of rotation upwards or downwards is dependent on the orientation of the link 85. The links 85 have a thicker section 105 on one surface of the link, while the opposite side has a thinner section 106. Depending on the orientation of these sections, the adjacent link will have its pivoting motion restricted more in one direction than the other. Links 110 have the thick section 105 on the lower side. Links 111 have the thick section 105 on the upper side. Multiple links 110 connected together with orientation having the thicker section 105 on the lower side will result in allowing a range of motion with a tighter radius towards the inner direction. Multiple links 111 connected together with orientation having the thicker section 105 on the upper side will result in a range of motion with a tighter radius towards the outer direction. When links of different orientation are adjacent, meaning a link 110 next to a link 111 with an opposite orientation, this will allow for the tightest bend radius possible. It is the limits of the relative rotational movement from center link to center link that provides protection to the wire in between the termination links 55. The center links 85 prevent bending radiuses that would cause damage as well as provide support for the wire 50 along the inner surface 112. In actual function, the wire 50 could come in contact with various inner portions 112 of the wire protection system 30 beyond what is shown in the figure. FIGS. 10*a-c* include illustrates of regions M where the maximum tight radius is achievable due to adjacent links 85 where the thick sections 105 are on opposite upper and lower sides.

With particular reference to FIG. 10*a*, this shows the wire protection system positioned when the axle 21 is at normal operating ride height With particular reference to FIG. 10*b*, this shows the wire protection system 30 positioned when the axle 21 is extended below the inverter 28 position at its fullest extent possible.

With particular reference to FIG. 10*c*, this arrangement shown illustrates the wire protection system 30 positioned when the axle 21 is extended above the inverter 28 position at its fullest extent possible. This position can occur in a situation when the suspension is in full jounce mode. Without the wire protection system 30 in place, moving throughout these ranges shown in FIGS. 10*a*-10*c*, especially in a quick succession, would result in the bare wiring becoming excited by the movement and vibration, to the point where the wiring could be bent in a tighter radius than it can withstand, leading to failure of the insulation or the wire itself. The wire protection system 30 limits the amount that the wire 50 will bend. If the undesirable bending occurs too often, arcing between the three conductors could occur. Additionally, any other combination of angles among and between the wires due to movement in the Z axis could occur. This movement of the axle 21 relative to the inverter 28 could also have components of movement around the Y axis, adapting to various responses of the axle 21 and suspension during vehicle operation.

Figure 11A:
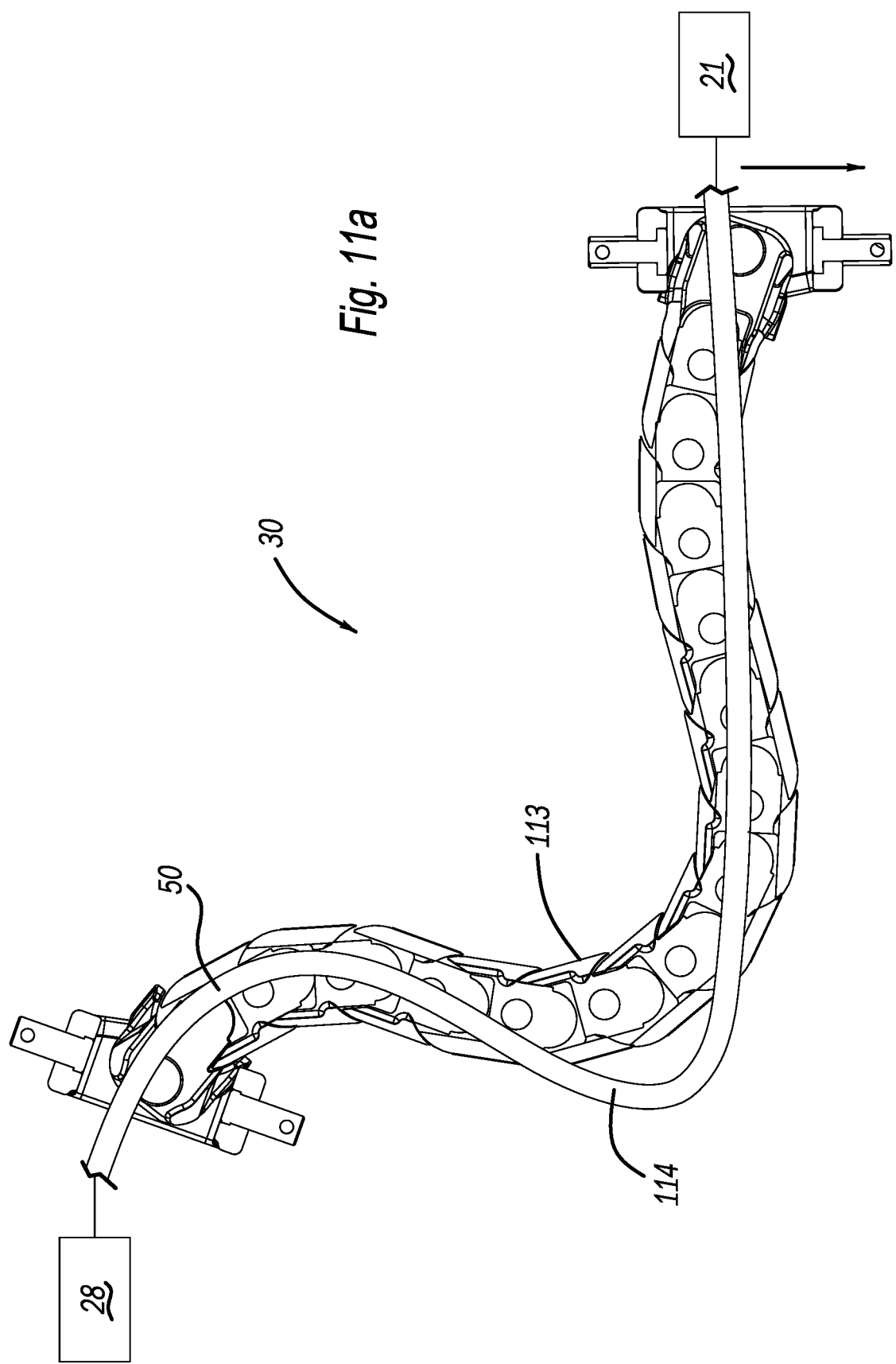
FIG. 11a is a cross-sectional side view of the wire protection system shown in FIG. 10b, but compares the wire bend radius with and without the wire protection system.

With particular reference to FIG. 11*a*, the wire protection system 30 is shown in the same position as FIG. 10*b*, where the axle 21 is extended below the inverter 28 position at its fullest extent possible. FIG. 11*a* shows the wire 50 shape if there was no wire protection system 30 restraining its motion. Note, the bend radius 113 with the wire protection system 30 is larger than the bend radius 114 without. Thus, wire protection system 30 reduces the amount of bending of the wire 50 at the lower left corner of the wire 50 in the illustration. Of course, it will be appreciated that the repetitive movement of the axle 21 and corresponding movement of the wire 50 could result in the overly small radius at other locations when the wire protection system 30 is not provided. Thus, provision of the wire protection system 30 operates to limit the wire 50 from becoming in a position with the undesirable small radius condition shown in FIG. 11a.

Figure 11B:
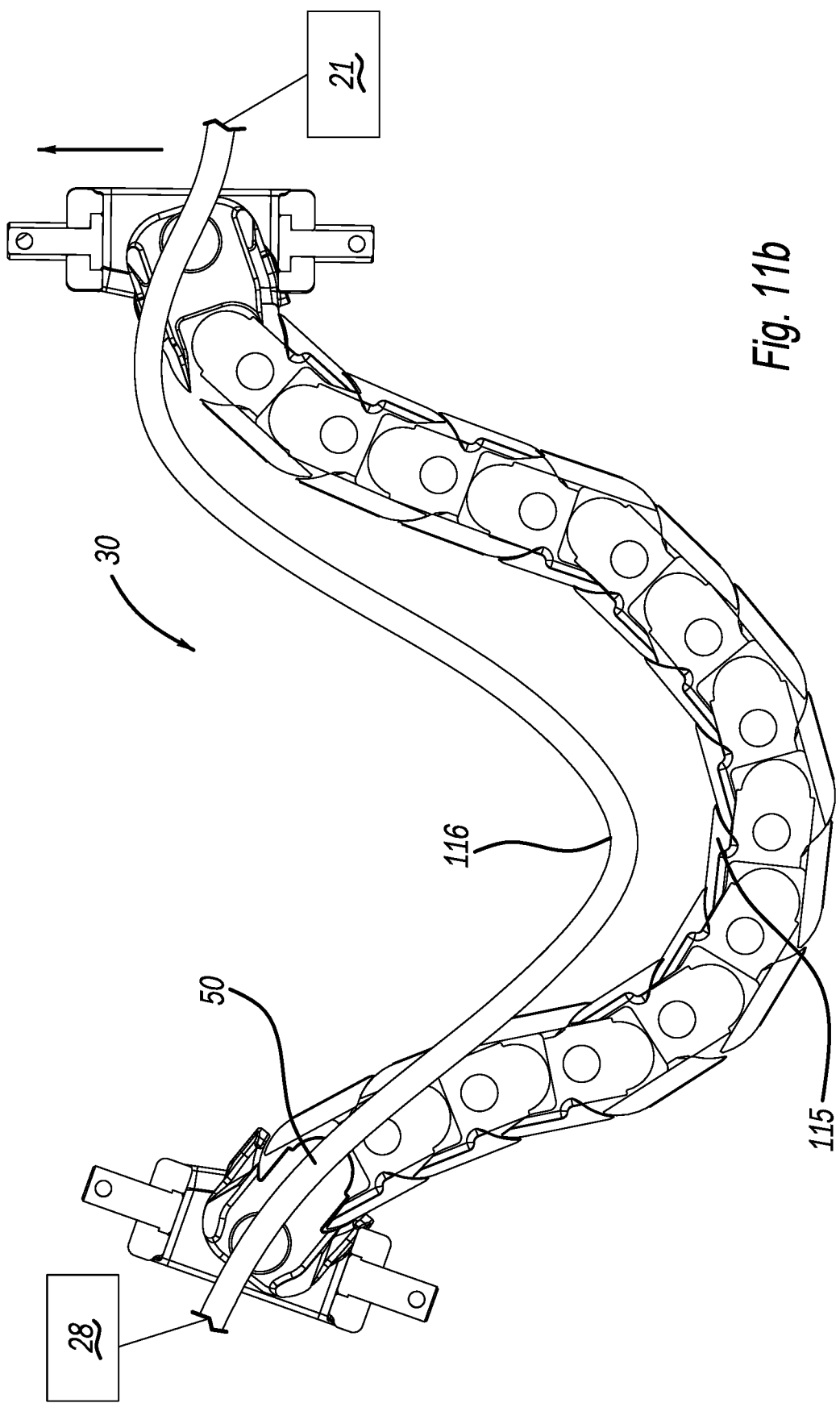
FIG. 11b is a cross-sectional side view of the wire protection system shown in FIG. 10c, but compares the wire bend radius with and without the wire protection system.

With particular reference to FIG. 11b, the wire protection system 30 is in the same position as FIG. 10c, where the axle 21 is extended above the inverter 28 position at its fullest extent possible. FIG. 11b shows wire 50 shape if there was no wire protection system restraining its motion. Note, the bend radius 115 with the wire protection system 30 is larger than the bend radius 116 without. Understand that during vehicle 20 operation and constant movement by the suspension, the wire 50 without the wire protection system 30 would be constantly cycled between these and other positions, resulting in the wire 50 bending in various directions and at various radius, some tighter than allowed resulting in failure of the wire 50. Similar to that described above, the wire 50 could also be in other undesirable small radius positions without provision of the wire protection system 30, and the illustrated location of the small radius 116 is but one example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed:

1. A wire protection system comprising: a first supporting structure with integral pivoting joints; a second supporting structure with integral pivoting joints; a flexible central wire supporting structure linking together the first supporting structure and the second supporting structure;
    wherein the supporting structure include travel reducing features to limit the bend radius of an enclosed wire,
    wherein the flexible central wire supporting structure has a first end and a second end, wherein the first and second ends are each pivotable about a vertical axis relative to the first and second supporting structure, wherein the flexible central wire supporting structure includes a first collar at the first end and a second collar at the second end, wherein the first collar is pivotable about the vertical axis relative to the first supporting structure and the second collar is pivotable about the vertical axis relative to the second supporting structure.

2. The wire protection system of claim 1, wherein the flexible central wire supporting structure includes terminal links at the first and second ends, wherein each of the terminal links is pivotable about a horizontal axis relative to the first and second collars, respectively.

3. The wire protection system of claim 2, wherein the flexible central wire supporting structure includes a plurality of interconnected central links, wherein adjacent links of the interconnected central links are connected to one another via a pin and hole connection defining a horizontal pivot axis.

4. The wire protection system of claim 3, wherein the central links and the terminal links are pivotable relative to each other about the horizontal pivot axes in response to vertical movement of the first supporting structure relative to the second supporting structure.

5. The wire protection system of claim 4, wherein the flexible central wire supporting structure is pivotable about the vertical axis of the second supporting structure in response to lateral movement of the first supporting structure.

6. The wire protection system of claim 5, wherein the central links and the terminal links remain horizontally aligned in response to the lateral movement of the first supporting structure.

7. The wire protection system of claim 1, wherein the flexible central wire supporting structure is configured to flex in a vertical direction and adjust one or more bend radiuses defined by the flexible central wire supporting structure in response to vertical movement of the first supporting structure.

8. The wire protection system of claim 1, wherein the first supporting structure is fixedly to an axle of an electric vehicle, and the second supporting structure is fixed to an inverter of the electric vehicle, wherein the axle is moveable relative to the inverter during operation of the electric vehicle.

9. The wire protection system of claim 8, wherein one or more wire conductors extend through a channel defined by the flexible central wire supporting structure, wherein the one or more wire conductors are fixed at opposite ends to the axle and the inverter via connectors.

10. The wire protection system of claim 9, further comprising a strain relief mechanism attached to the axle and the inverter and fixed relative to the axle and the inverter respectively, wherein the strain relief mechanism is disposed between the connectors and the first supporting structure and between the connectors and the second supporting structure.

11. The wire protection system of claim 10, wherein the strain relief mechanism includes a relief formed in a mounting block, wherein a diameter of the relief in the mounting block is smaller than a diameter of the one or more wire conductors, wherein the one or more wire conductors is held in place via an interference fit.

12. The wire protection system of claim 1, wherein the flexible central wire supporting structure is moveable and bendable along a virtual plane, wherein the virtual plane is pivotable in response to vertical, lateral, and fore-and-aft movement of the first supporting structure relative to the second supporting structure.

13. A flexible wire protection system comprising:
    an axle for use in an electric vehicle;
    an inverter for use in the electric vehicle;
    a flexible wire extending between the inverter and the axle and which is fixed at opposite ends to the axle and the inverter;
    a flexible wire support structure surrounding the flexible wire, wherein the flexible wire extends through a channel defined by the flexible wire support structure;
    a first support structure fixed to the axle and including a first dual axis pivot mechanism;
    a second support structure fixed to the inverter and including a second dual axis pivot mechanism;
    wherein the flexible wire support structure is attached at opposite ends to the first and second dual axis pivot mechanisms;
    wherein movement of the axle relative to the inverter causes corresponding movement of the first supporting structure and bending of the flexible wire support structure;

wherein a bend radius of the flexible wire support structure is limited, wherein the flexible wire support structure correspondingly limits the bend radius of the flexible wire extending therethrough.

14. The flexible wire protection system of claim 13, wherein the flexible wire support structure includes a plurality of interconnected links pivotable relative to each other, wherein adjacent links are limited in a degree of pivoting relative to each other.

15. The flexible wire protection system of claim 14, wherein the plurality of interconnected links include a pair of terminal links at opposite ends, wherein the terminal links are each pivotably connected to a collar, wherein the collars are pivotably connected relative to the axle and the inverter, respectively.

16. The flexible wire protection system of claim 15, wherein the terminal links and the collars define the first and second dual axis pivot mechanisms, wherein the terminal links are pivotable about a horizontal axis relative to the collars and the collars are pivotable about a vertical axis relative to the axle and the inverter, respectively.

17. The flexible wire protection system of claim 16, wherein the terminal links include upper and lower stop pads, and the collars include upper and lower counteracting surfaces, wherein contact between the stop pads and the upper and lower counteracting surfaces limits pivotable movement of the terminal links relative to the collars.

18. The flexible wire protection system of claim 17, wherein the plurality of interconnected links includes central links connected between the terminal links, wherein each central link includes an upper portion and a lower portion, wherein one of the upper portion or the lower portion is a thick portion and the other of the upper portion or the lower portion is a thin portion, wherein an allowable bend radius along the flexible wire support structure is dependent on the arrangement of the thick portions and the thin portions of adjacent central links.

19. A wire protection system for an electric vehicle having an axle and an inverter, the wire protection system comprising:
a first supporting structure fixed to the axle and having integral joints;
a second supporting structure fixed to the inverter and having with integral joints;
a flexible central wire supporting structure linking together the first supporting structure and the second supporting structure;
a wire conductor extending through a channel defined by the flexible central wire supporting structure, the wire conductor being fixed at opposite ends to the axle via a first connector and to the inverter via a second connector;
strain relief mechanisms attached to the axle and to the inverter, the strain relief mechanisms are disposed between the first connector and the first supporting structure and between the second connector and the second supporting structure;
wherein the axle is moveable relative to the inverter during operation of the electric vehicle.

20. The wire protection system of claim 19, wherein the flexible central wire supporting structure is moveable and bendable along a virtual plane, and wherein the virtual plane is pivotable in response to vertical, lateral and fore-and-aft movement of the first supporting structure relative to the second supporting structure.

* * * * *